July 20, 1965   R. B. MADDOX   3,195,849
EASEL CONSTRUCTION
Filed Jan. 2, 1964   2 Sheets-Sheet 1

INVENTOR
ROBERT B. MADDOX
BY
HIS ATTORNEYS

July 20, 1965 R. B. MADDOX 3,195,849
EASEL CONSTRUCTION
Filed Jan. 2, 1964
2 Sheets-Sheet 2

INVENTOR.
ROBERT B. MADDOX
BY
HIS ATTORNEYS

United States Patent Office 3,195,849
Patented July 20, 1965

3,195,849
EASEL CONSTRUCTION
Robert B. Maddox, Cincinnati, Ohio, assignor to Robert B. Maddox Associates, Inc., Cincinnati, Ohio, a corporation of Ohio
Filed Jan. 2, 1964, Ser. No. 337,708
2 Claims. (Cl. 248—441)

This application is a continuation-in-part of the copending patent application, Serial Number 159,419, filed December 14, 1961, now abandoned and entitled Easel Construction.

This invention relates to an improved easel construction and the like and to improved parts for such an easel construction or the like.

Heretofore, various easel constructions have been provided which include suitable frame means for supporting an easel board or the like, the easel board being utilized to mount various articles so that an audience can view the articles mounted on the easel board.

However, when a lecturer is adressing an audience, the lecturer is normally standing while the audience is seated at a level usually different from that utilized by the lecturer. When the lecturer utilizes an easel board or the like for displaying articles, he tends to mount the same in a position comfortable to himself whereby the mounted articles are not at the proper eye level of the audience.

According to the present invention, an improved easel construction is provided which includes a frame structure slidably carrying an easel board or the like whereby an instructor or lecturer can mount articles on the easel board in a position that is comfortable to the lecturer and, thereafter, the easel board is adjusted relative to the frame structure so that the article mounted thereon is placed in the most desirable position for viewing by an audience.

For example, in classroom study wherein flash cards or similar visual aid materials are utilized to teach reading, arithmetic and the like, to elementary students, the teacher can raise the easel board relative to the frame structure so that a flash card can be readily mounted thereon by the teacher standing in erect position and, thereafter, the teacher can lower the easel board relative to the frame structure to bring the mounted flash cards within the eye level of the seated elementary students so that they can readily view the mounted articles.

Accordingly, it is an object of this invention to provide an improved easel construction.

Another object of this invention is to provide an improved easel construction comprising a frame structure and an easel board slidably mounted to the frame structure whereby the vertical position of the easel board relative to the frame structure can be readily adjusted.

A further object of this invention is to provide such an easel construction wherein means are provided on the easel board for readily mounting articles thereto.

Another object of this invention is to provide such an easel construction whereby means are carried by the easel board for fixedly securing the easel board relative to the frame construction in a desired position thereof.

Other objects, uses and advantages of the invention will become apparent from the following description which proceeds with reference to the accompanying drawings forming a part thereof and wherein.

While the various features of the invention are hereinafter described and illustrated as being included in a single easel, construction or the like, it is to be understood that the various features of this invention can be utilized singly or in any combination thereof to form other constructions as desired. Therefore, the invention is not to be limited to the embodiment thereof illustrated and described herein, because the specification and drawings are intended merely to illustrate and describe one embodiment of the invention.

Figure 1:
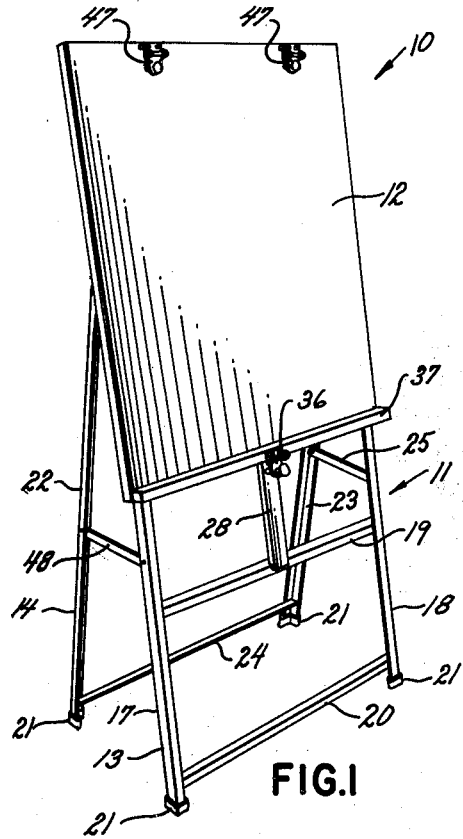
FIGURE 1 is a front perspective view of the improved easel construction of this invention.
Figure 2:
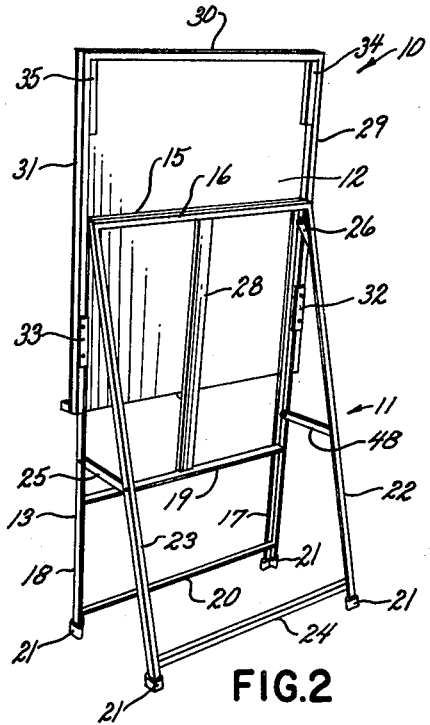
FIGURE 2 is a rear perspective view of the easel construction of FIGURE 1.

Referring now to FIGURES 1 and 2, the improved easel construction of this invention is generally indicated by the reference numeral 10 and comprises a substantially A frame structure 11 and an easel board 12, the easel board 12 being substantially vertically adjustable relative to the frame structure 11 and adapted to be held in a fixed position relative to the frame structure 11 in a manner hereinafter described.

The frame structure 11 comprises a pair of substantially U-shaped members 13 and 14 respectively formed from angle iron structure and having the cross members 15 and 16 thereof suitably secured together to form the A structure.

The U-shaped frame member 13 has a pair of spaced parallel legs or support members 17 and 18 extending downwardly from the cross member 15 and suitably braced by horizontal members 19 and 20, the free ends of the support members 17 and 18 carrying resilient feet 21 or the like to support the U-shaped frame member 13 on a supporting structure.

Similarly, the U-shaped frame member 14 has a pair of spaced parallel legs or support members 22 and 23 extending downwardly from the cross member 16 and suitably braced by a horizontal support member 24, the free ends of the support members 22 and 23 carrying resilient foot members 21 or the like to support the U-shaped frame member 14 relative to a supporting structure.

If desired, the U-shaped frame members 14 and 13 can be adapted to be collapsed relative to each other in a manner well known in the art to provide a foldable or collapsible frame structure 11.

A pair of brace members 48 and 25 respectively interconnect the pairs of support or pivot members 17, 22 and 18, 23 intermediate the ends thereof while a pair of support members 26 and 27 respectively interconnect the pairs of support members 17, 22 and 18, 23 together at the upper ends thereof, the brace members 26 and 27 providing stop means in a manner hereinafter described.

A substantially vertically extending intermediate support member 28 interconnects the cross member 15 of the U-shaped frame member 13 with the cross member 19 thereof for a purpose hereinafter described, the intermediate support member 28 preferably being formed of material which is slip-resistant, such as wood or the like.

The easel board 12 is a substantially flat structure having the rear surface thereof bounded on three sides by rearwardly extending edge members 29, 30 and 31 in the manner illustrated in FIGURE 2, the opposed edge members 29 and 31 being disposed apart a distance sufficient to receive the support members 17 and 18 of the U-shaped frame members 17 and 18 engage the inboard surfaces of the border members 29 and 31 but permit relative movement therebetween.

In this manner, the easel board 12 is adapted to be moved vertically relative to the frame structure 11 while the frame structure 11 holds the easel board 12 from moving other than in a substantially vertical plane.

Figure 5:
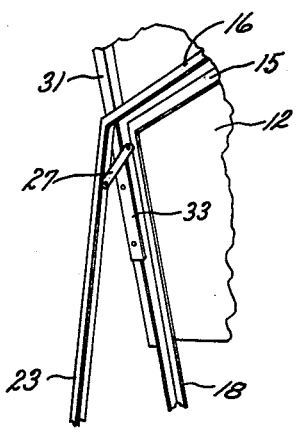
FIGURE 5 is a fragmentary perspective view of the easel construction of FIGURE 1 and illustrates one of the stop means of this invention.

The border members 29 and 31 of the easel board 12 respectively carry inwardly extending platelike members 32 and 33 which respectively extend over the rear surfaces of the support members 17 and 18 in the manner illustrated in FIGURE 5 whereby the easel board 12 is telescopically secured to the frame structure 11 but vertically adjustable thereto.

Downward vertical movement of the easel board 12 relative to the frame 11 is limited by stop means 34 and 35 carried by the rear surface of the easel board 12 as illustrated in FIGURE 2, the stop means 34 and 35 abutting the cross member 15 of the U-shaped frame member 13 when the easel board 12 has been lowered to its lowest position.

To limit vertical movement of the easel board 12 in an upwardly direction, the plate-like members 32 and 33 respectively engage the upper brace members 26 and 27 in the manner illustrated in FIGURE 5 to limit upward vertical movement of the easel board 12 relative to the frame structure 11.

Therefore, it can be seen that the easel board 12 can be vertically adjusted relative to the frame structure 11 to place the easel board 12 in any desired vertical position.

In order to hold the easel board 12 in the desired adjusted vertical position thereof, a holding member 36 is carried by an outwardly extending sill member 37 disposed adjacent the bottom edge of the easel board 12 at the front surface thereof.

Figure 3:
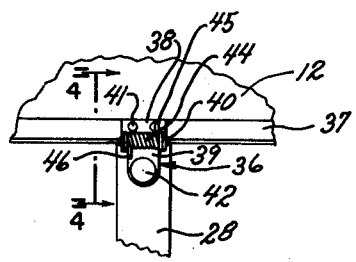
FIGURE 3 is an enlarged fragmentary front view of the easel board holding construction of this invention.
Figure 4:
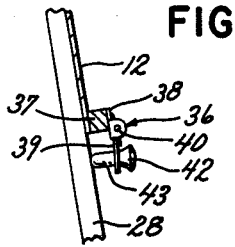
FIGURE 4 is a fragmentary cross-sectional view taken on line 4—4 of FIGURE 3.

As illustrated in FIGURES 3 and 4, the holding member 36 comprises a pair of plate-like members 38 and 39 hinged together by a pivot pin 40 with the plate-like member 38 being secured to the sill 37 by screws 41 or the like, the plate-like member 39 carrying a handle 42 on one side thereof and resilient bumper 43 on the other side thereof which is adapted to engage the intermediate support member 28 for a purpose hereinafter described.

A spring 44 encompasses the pivot pin 40 and has one end 45 bearing against the plate-like member 38 while the other end 46 thereof bears against the plate-like member 39 so that the spring 44 tends to force the bumper 43 into frictional engagement with the intermediate support member 28.

In this manner, the spring 44 urges the bumper 43 into frictional engagement with the intermediate support member 28 to fixedly hold the easel board 12 in a fixed vertical position relative to the frame structure 11.

When it is desired to adjust the easel board 12 relative to the frame member 11, the operator merely grasps the handle 42 of the holding means 36 and pulls outwardly thereon to move the bumper 43 out of engagement with the intermediate supprt member 28 in opposition to the force of the spring 44 whereby the easel board 12 can be vertically adjusted relative to the frame structure 11.

After the easel board 12 has been moved to the desired position relative to the frame structure 11, the operator releases the handle 42 of the holding member 36 whereby the spring 44 again urges the bumper 43 into frictional engagement with the intermediate support member 28 to hold the easel board 12 in the desired position relative to the frame structure 11.

A pair of holding members 47 are carried by the easel board 12 in any desired position thereon and are formed in substantially the same manner as the holding member 36 whereby the particular structure of the holding members 47 will not be described, it being understood that the holding members 47 operate in substantially the same manner as the holding members 36 except that the bumpers of the holding members 47 bear against the front surface of the easel board 12. In this manner, the holding members 47 can be utilized to hold articles against the front surface of the easel board 12 in a manner well known in the art.

Therefore, it can be seen that the easel construction 10 of this invention readily permits the operator to place articles against the easel board 12 either by resting the same against the sill 37 thereof or holding the same against the front surface of the easel board 12 by the holding members 47, as desired.

Thereafter, the operator can readjust the position of the easel board 12 relative to the frame structure 11 to bring the articles carried by the easel board 12 into the proper eye level of the audience.

Subsequently, the operator can again move the easel board 12 back to its original position, which is comfortable to the operator, to remove the articles from the easel board 12 and affix other articles thereto to again be moved back to the desired level of the audience.

Another easel construction of this invention is generally indicated by the reference numeral 50 in FIGURES 6–9 and is utilized in substantially the same manner as the easel construction 10 previously described.

In particular, the easel construction 50 of this invention includes a substantially A-shaped frame means 51 comprising a plurality of substantially vertically extending L-shaped supports 52, 53, 54 and 55 interconnected together in the manner previously described except that the frame means 51 of the easel construction 50 does not have the intermediate support 28 and cross bar 19 provided in the easel construction 10 previously described.

An easel board 56 is adapted to be slidably mounted to the front supports 52 and 53 of the frame means 51 to be utilized in the same manner as the easel board 12 previously described.

Figure 7:
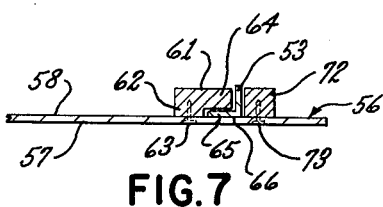
FIGURE 7 is an enlarged, fragmentary, cross-sectional view taken on line 7—7 of FIGURE 6.

As illustrated in FIGURE 7 the easel board 56 has a front surface 57 and a rear surface 58, the front surface 57 of the easel board 56 carrying suitable article attaching means 59 on the upper end thereof in a manner similar to the article attaching means 47 previously described.

When the demonstrator wishes to place material onto the easel board 56 and utilize the attaching means 59 thereof, the operator can hold the material in his right hand and by reaching vertically upwardly with his left hand lift up on the movable portion 60 of the left hand attaching means 59 whereby such upward vertical force on the attaching means 59 does not have a tendency to move the easel construction 50 backwardly.

With the movable portion 60 of the left hand attaching means 59 opened by upward vertical movement thereon, the operator can place the left hand portion of the materials under the opened member 60 and, thereafter, release the same whereby the left hand attaching means 59 will clamp the left hand portion of the material against the easel board 56.

Thereafter, the operator grasps the material at the central portion of the bottom edge thereof with his left hand and with his right hand raises the movable portion 60 of the right hand attaching means 59 vertically upwardly to open the same so that the right hand portion of the material can be pivoted upwardly between the easel board 56 and the movable portion 60 of the right hand attaching means 59. Subsequently, the operator releases the movable portion 50 of the right hand attaching means 59 whereby the same clamps the right hand portion of the material against the easel board 56.

Therefore, it can be seen that it is a relatively simple method of attaching rather cumbersome material to the easel board 56 for display thereof or the like during a lecture, etc.

The easel board 56 of this invention is adapted to be slidably movable on the front supports 52 and 53 of the frame means 51 in a manner now to be described.

Figure 8:
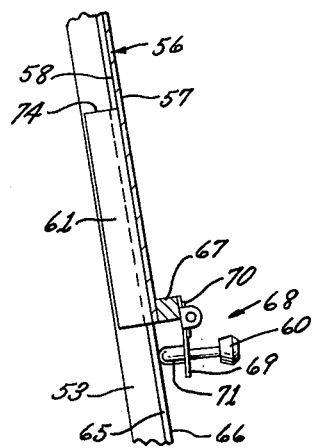
FIGURE 8 is an enlarged, fragmentary, cross-sectional view taken on line 8—8 of FIGURE 6.
Figure 9:
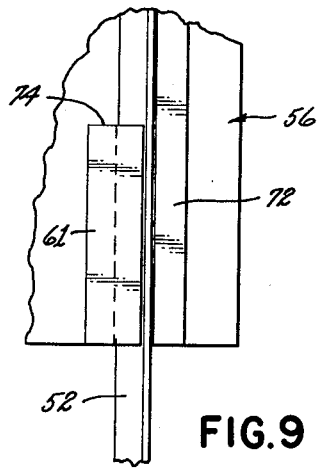
FIGURE 9 is an enlarged, fragmentary rear view of a portion of the easel construction illustrated in FIGURE 6.

As illustrated in FIGURES 7–9, a pair of retainer means 61 are respectively secured to the side 58 of the easel board 56 inboard of the supports 52 and 53.

In particular, each retainer means 61 comprises an elongated length, approximately one foot or the like, and has a substantially L-shaped cross section defined by an arm 62 secured to the easel board 56 by suitable fastening means 63 and another arm 64 adapted to be disposed over the side 65 of the respective support 52 or 53 while the easel board 56 has the side 58 thereof disposed against the side 66 of the support 52 or 53.

The lower shelf portion 67 of the easel board 56 carries a holding means 68 constructed in substantially the same manner as the folding means 36 previously described whereby the holding means 68 has a movable portion 69 continuously urged toward the front surface 66 of the support 53.

In particular, reference is made to FIGURE 8 wherein the holding means 68 has the movable portion 69 thereof continuously urged toward the support 53 by a spring means 70 whereby a resilient bumper 71 or the like carried by the movable portion 59 frictionally engages against the front surface 66 of the support 53 to tend to draw the overlapping portions 64 of the retainer means 61 against the side 65 of the supports 52 and 53 to frictionally hold the easel board 56 in its adjusted position on the supports 52 and 53.

Thus, the operator, when he desires to adjust the easel board 56, merely pulls outwardly on the movable portion 69 of the holding means 68 in opposition to the force of the spring means 70 whereby the easel board 56 can be moved vertically upwardly or downwardly within the limits of the frame means 51 to position the easel board 56 in the desired position.

With the easel board 56 now in the desired position, the operator releases the movable portion 69 of the holding means 68 whereby the bumper 71 pushes against the side 66 of the support 53 to draw the overlapping portions 64 of the retainer means 61 against the sides 66 of the supports 52 and 53 to frictionally hold the easel board 56 in its selected position.

If desired, the easel board 56 can carry a pair of guide means 72 in the manner illustrated in FIGURE 7 wherein the guide means 72 are disposed outboard of the support means 52 and 53 and help guide the easel board 56 relative thereto, the guide means 72 being secured to the side 58 of the easel board 56 by suitable fastening means 73.

However, it is to be understood that the guide means 72 could be eliminated if desired.

Therefore, it can be seen that not only does the retainer means 61 of this invention provide means for frictionally holding the easel board 56 in the desired adjusted position thereof, but also the upper surface 74 of the retainer means 61 can limit the upward movement of the easel board 56 relative to the frame means 51 in the same manner as the means 33 previously described.

Figure 6:
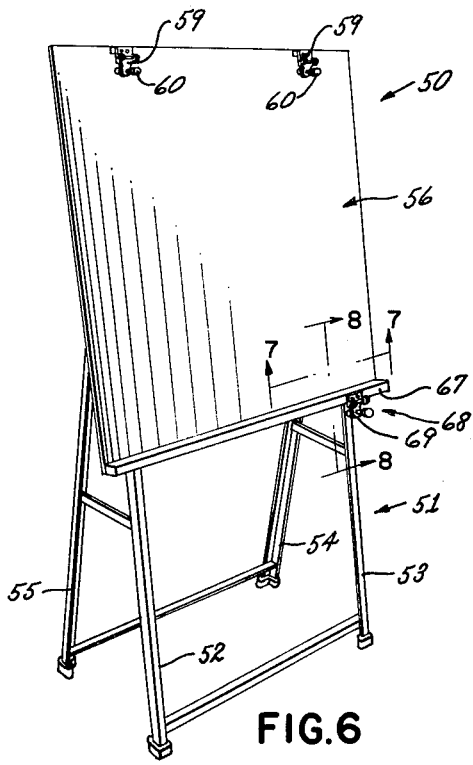
FIGURE 6 is a view similar to FIGURE 1 and illustrates another embodiment of this invention.

Another feature of this invention is to provide the article attaching means 59 and holding means 68 with elongated handle portions 60 as illustrated in FIGURES 6 and 8 whereby the operator needs only to lift vertically upwardly on the elongated handle portions 60 to open the hinged portions thereof. In this manner, the operator does not have to pull outwardly and upwardly on the attaching means 59 and holding means 68 to open the same because a straight vertical motion upwardly on the handle portions 60 will open the attaching means 59 and holding means 68 through the mechanical advantage provided by the elongated handles 60.

Accordingly, it can be seen that improved easel constructions are provided by this invention which readily permit vertical adjustment of the easel boards thereof in a relatively simple and effective manner.

While particular embodiments of the invention have been illustrated and described, it will be obvious to those skilled in the art that various changes and modifications can be made without departing from the invention; and it is intended to include in the appended claims all such changes and modifications that fall within the true spirit and scope of the invention.

Having thus described the invention, what I claim as new and useful and desire to secure by United States Letters Patent, is:

1. In combination an easel frame comprising two inverted U-shaped frame members each of which comprises a cross element and two parallel arm elements, the arm elements of said members being interconnected intermediate the ends thereof by pivoted brace members, said frame members being interconnected adjacent the ends of the arm elements adjacent the cross elements by upper pivoted brace members, a cross member interconnecting the arms of one frame member at a point adjacent the mid point of said arm elements, an intermediate support member equally spaced between said arm elements of the one frame member extending from said cross element to said cross member, an easel board comprising a flat surface structure having three edge members secured to the periphery of the easel board of the flat structure on the rear surface thereof along the top and down the two sides thereof, the two side edge members being spaced apart a distance sufficient to receive the arm elements of said one U-shaped member therebetween, said side edge members having inwardly extending plate-like members secured thereto adjacent the ends thereof remote from the top edge member and extending inwardly over the rear surfaces of said arm elements of the first U-shaped member to interengage said board and frame in sliding relationship, stop means on the rear surface of said flat surface structure for abutting the cross element of the one U-shaped member to limit movement of the easel board relative to the frame in a first direction, said inwardly extending members disposed to engage the upper brace members to limit the movement of the board relative to the frame in a second direction, a sill member carried by the front face of said flat structure at the bottom edge thereof, a holding member secured to said sill member intermediate the side edges of said easel board and vertically aligned with said intermediate support member, said holding member comprising a pair of plate-like members, a pivot pin hinging said plate-like members together, a spring encompassing the pivot pin with the ends thereof engaging the plate-like members, one of said plate-like elements being secured to the sill member, the other plate-like member carrying a handle on one side thereof and a resilient bumper on the other side thereof, said spring urging said bumper into frictional engagement with the intermediate support member.

2. In combination an easel frame comprising two inverted U-shaped frame members each of which comprises a cross element and two parallel arm elements, the arm elements of said members being interconnected intermediate the ends thereof by brace members, said frame members being interconnected adjacent the ends of the arm elements adjacent the cross elements by upper brace members, an easel board comprising a flat surface structure having two retainer means and two guide means secured to the periphery of the easel board of the flat structure on the rear surface thereof down the two sides thereof, the two guide means being spaced apart a distance sufficient to receive the arm elements of a first of said U-shaped members therebetween, said retainer means having laterally extending portions and being secured to said surface structure adjacent the bottom, said laterally extending portions over the rear surfaces of said arm elements of the first U-shaped member to interengage said board and frame in sliding relationship, a sill member carried by the front face of said flat structure at the bottom edge thereof, a holding member secured to said sill member in vertical alignment with an arm element of the first U-shaped member, said holding member comprising a pair of plate-like members hinged together by a pivot pin, hinging said plate-like members together, a spring encompassing the pivot pin with the ends thereof engaging the plate-like members, one of said plate-like elements being secured to the sill member, the other plate-like member carrying a handle on one side thereof and a resilient bumper on the other side thereof, said spring urging said bumper into frictional engagement with the arm element adjacent thereto to engage the retainer means adjacent thereto with the arm element and an attaching means identical with said above mentioned holding means secured to the top front face of said easel board for the attachment of material thereto.

References Cited by the Examiner

UNITED STATES PATENTS

| | | | |
|---|---|---|---|
| 518,544 | 4/94 | Faint | 248—449 |
| 1,888,773 | 11/32 | Ruelland | 248—452 |
| 2,083,839 | 6/37 | Grieve | 248—449 |
| 2,142,317 | 1/39 | Jarrett | 248—449 |
| 2,638,300 | 5/53 | De Jen | 248—448 |
| 2,912,203 | 11/59 | Townsend | 248—448 |
| 3,015,906 | 1/62 | Guth | 248—449 |

FOREIGN PATENTS 20,517  9/97  Great Britain.

CLAUDE A. LE ROY, *Primary Examiner.*